US008821705B2

(12) United States Patent
Bjornson et al.

(10) Patent No.: US 8,821,705 B2
(45) Date of Patent: Sep. 2, 2014

(54) DIGITAL MICROFLUIDICS SYSTEM WITH DISPOSABLE CARTRIDGES

(75) Inventors: Torleif Ove Bjornson, Gilroy, CA (US); Marc Nathan Feiglin, East Brunswick, NJ (US); Michael Benjamin Franklin, Bailey, CO (US); Anne R. Kopf-Sill, Portola Valley, CA (US); Travis Lee, Brisbane, CA (US); Kailiang Wang, Sunnyvale, CA (US)

(73) Assignee: Tecan Trading AG, Mannedorf (SE)

( * ) Notice: Subject to any disclaimer, the term of this patent is extended or adjusted under 35 U.S.C. 154(b) by 145 days.

(21) Appl. No.: 13/304,481

(22) Filed: Nov. 25, 2011

(65) Prior Publication Data

US 2013/0134039 A1 May 30, 2013

(51) Int. Cl.
*G01N 27/00* (2006.01)

(52) U.S. Cl.
USPC ........... 204/600; 204/450; 422/512; 422/547; 422/551; 422/552; 422/561

(58) Field of Classification Search
USPC ......... 204/600, 450, 451, 643, 604, 453, 547; 422/50, 430, 500, 504, 512, 551
See application file for complete search history.

(56) References Cited

U.S. PATENT DOCUMENTS

| | | | | |
|---|---|---|---|---|
| 5,486,337 | A | 1/1996 | Ohkawa | |
| 6,565,727 | B1 | 5/2003 | Shenderov | |
| 2004/0055891 | A1 | 3/2004 | Pamula | |
| 2005/0217997 | A1* | 10/2005 | Goncalves | 204/616 |
| 2008/0038810 | A1 | 2/2008 | Pollack et al. | |
| 2009/0203063 | A1 | 8/2009 | Wheeler et al. | |
| 2009/0298059 | A1 | 12/2009 | Gumbrecht et al. | |
| 2010/0025250 | A1 | 2/2010 | Pamula | |
| 2010/0081578 | A1 | 4/2010 | Wheeler | |
| 2010/0236929 | A1 | 9/2010 | Pollack | |
| 2010/0282609 | A1* | 11/2010 | Pollack et al. | 204/450 |
| 2011/0070440 | A1* | 3/2011 | Linhardt et al. | 428/402 |
| 2011/0104816 | A1 | 5/2011 | Pollack | |
| 2011/0220505 | A1 | 9/2011 | Wang | |

FOREIGN PATENT DOCUMENTS

| | | |
|---|---|---|
| WO | WO 2007/005974 | 1/2007 |
| WO | WO 2008/106678 | 9/2008 |
| WO | WO 2009/032863 | 3/2009 |
| WO | WO 2009/140373 | 11/2009 |
| WO | WO 2010037763 A1 * | 4/2010 |
| WO | WO2010069977 | 6/2010 |
| WO | WO2011002957 | 1/2011 |

OTHER PUBLICATIONS

Lebrasseur, Eric, et al, Two-dimensional eletrostatic actuation of droplets using a single electrod panel and development of disposable plastic film card, Science Direct, Sensors and Actuators 136. 2007. 358-366 (www.sciencedirect.com).

* cited by examiner

*Primary Examiner* — Luan Van
*Assistant Examiner* — Maris R Kessel
(74) *Attorney, Agent, or Firm* — Notaro, Michalos & Zaccaria P.C.

(57) ABSTRACT

A digital microfluidics system manipulates samples in liquid droplets within disposable cartridges and has disposable cartridges each with a bottom layer, a top layer and a gap therebetween. A base unit with cartridge accommodation sites and at least one electrode array with electrodes works with a cover plate at the sites and a control unit for controlling selection of the electrodes and for providing them with voltage pulses for manipulating liquid droplets within the cartridges by electrowetting. The cover plate has an electrically conductive material that extends parallel to the array. A selection of disposable cartridges and a method for manipulating samples in liquid droplets that adhere to a hydrophobic surface can be used with the system.

42 Claims, 3 Drawing Sheets

DIGITAL MICROFLUIDICS SYSTEM WITH DISPOSABLE CARTRIDGES

FIELD OF TECHNOLOGY

Figure 1:
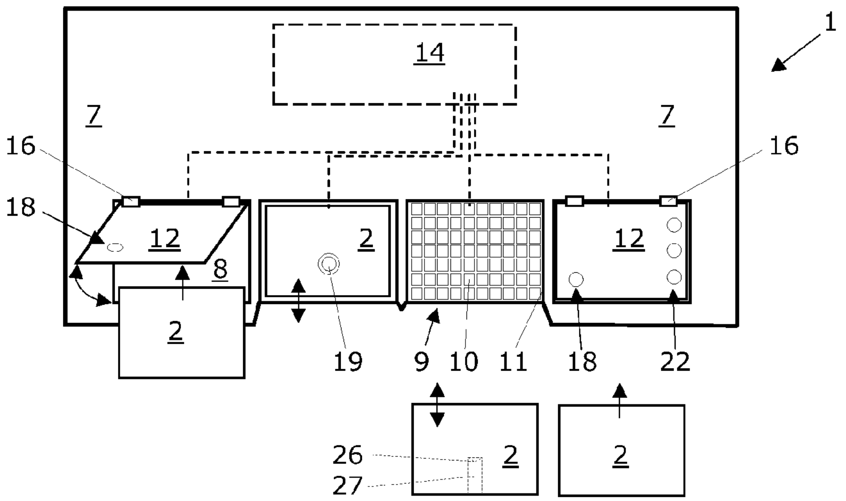

The present invention relates to a digital microfluidics system or device into which one or more disposable cartridges for manipulating samples in liquid droplets therein can be inserted. The digital microfluidics system comprises an electrode array supported by a substrate, and a central control unit for controlling the selection of individual electrodes of this electrode array and for providing them with individual voltage pulses for manipulating liquid droplets by electrowetting. Thus, the invention also relates to droplet actuator devices for facilitating droplet actuated molecular techniques.

RELATED PRIOR ART

Automated liquid handling systems are generally well known in the art. An example is the Freedom EVO® robotic workstation from the present applicant (Tecan Schweiz AG, Seestrasse 103, CH-8708 Männedorf, Switzerland). This device enables automated liquid handling in a stand-alone instrument or in automated connection with an analytical system. These automated systems typically require larger volumes of liquids (microliter to milliliter) to process. They are also larger systems that are not designed to be portable.

Many approaches to deal with the automated processing of biological samples originate from the field of microfluidics. This technical field generally relates to the control and manipulation of liquids in a small volume, usually in the micro- or nanoscale format. Liquid movement in a channel system is known per se as, e.g. being controlled by micro pumps in stationary devices or centripetal forces in rotating lab-ware. In digital microfluidics, a defined voltage is applied to electrodes of an electrode array, so that individual droplets are addressed (electrowetting). For a general overview of the electrowetting method, please see Washizu, IEEE Transactions on Industry Applications, Volume 34, No. 4, 1998, and Pollack et al., *Lab chip,* 2002, Volume 2, 96-101. Briefly, electrowetting refers to a method to move liquid droplets using arrays of microelectrodes, preferably covered by a hydrophobic layer. By applying a defined voltage to electrodes of the electrode array, a change of the surface tension of the liquid droplet, which is present on the addressed electrodes, is induced. This results in a remarkable change of the contact angle of the droplet on the addressed electrode, hence in a movement of the droplet. For such electrowetting procedures, two principle ways to arrange the electrodes are known: using one single surface with an electrode array for inducing the movement of droplets or adding a second surface that is opposite a similar electrode array and that provides at lest one ground electrode. A major advantage of the electrowetting technology is that only a small volume of liquid is required, e.g. a single droplet. Thus, liquid processing can be carried out within considerably shorter time. Furthermore the control of the liquid movement can be completely under electronic control resulting in automated processing of samples.

A device for liquid droplet manipulation by electrowetting using one single surface with an electrode array (a monoplanar arrangement of electrodes) is known from the U.S. Pat. No. 5,486,337. All electrodes are placed on a surface of a carrier substrate, lowered into the substrate, or covered by a non-wettable surface. A voltage source is connected to the electrodes. The droplet is moved by applying a voltage to subsequent electrodes, thus guiding the movement of the liquid droplet above the electrodes according to the sequence of voltage application to the electrodes.

An electrowetting device for microscale control of liquid droplet movements, using and electrode array with an opposing surface with at least one ground electrode of is known from U.S. Pat. No. 6,565,727 (a biplanar arrangement of electrodes). Each surface of this device may comprise a plurality of electrodes. The drive electrodes of the electrode array are preferably arranged in an interdigitated relationship with each other by projections located at the edges of each single electrode. The two opposing arrays form a gap. The surfaces of the electrode arrays directed towards the gap are preferably covered by an electrically insulating, hydrophobic layer. The liquid droplet is positioned in the gap and moved within a non-polar filler fluid by consecutively applying a plurality of electric fields to a plurality of electrodes positioned on the opposite sites of the gap.

Containers with a polymer film for manipulating samples in liquid droplets thereon are known from WO 2010/069977 A1: A biological sample processing system comprises a container for large volume processing and a flat polymer film with a lower surface and a hydrophobic upper surface. The flat polymer film is kept at a distance to a base side of the container by protrusions. This distance defines at least one gap when the container is positioned on the film. A liquid droplet manipulation instrument comprises at least one electrode array for inducing liquid droplet movements. A substrate supporting the at least one electrode array is also disclosed as well as a control unit for the liquid droplet manipulation instrument. The container and the film are reversibly attached to the liquid droplet manipulation instrument. The system thus enables displacement of at least one liquid droplet from the at least one well through the channel of the container onto the hydrophobic upper surface of the flat polymer film and above the at least one electrode array. The liquid droplet manipulation instrument is accomplished to control a guided movement of said liquid droplet on the hydrophobic upper surface of the flat polymer film by electrowetting and to process there the biological sample.

The use of such an electrowetting device for manipulating liquid droplets in the context of the processing of biological samples is also known from the international patent application published as WO 2011/002957 A2. There, it is disclosed that a droplet actuator typically includes a bottom substrate with the control electrodes (electrowetting electrodes) insulated by a dielectric, a conductive top substrate, and a hydrophobic coating on the bottom and top substrates. Also disclosed are droplet actuator devices for replacing one or more components of a droplet actuator, i.e. disposable components that may be readily replaced (such as movable films, reversibly attachable top and bottom substrates, and self-contained replaceable cartridges).

From the international application published as WO 2011/002957 A2, droplet actuators with a fixed bottom substrate (e.g. of a PCB), with electrowetting electrodes, and with a removable or replaceable top substrate are known. A self-containing cartridge may e.g. include buffers, reagents, and filler fluid. Pouches in the cartridge may be used as fluid reservoirs and may be punctured to release fluid (e.g. a reagent or oil) into a cartridge gap. The cartridge may include a ground electrode, which may be replaced by a hydrophobic layer, and an opening for loading samples into the gap of the cartridge. Interface material (e.g. a liquid, glue or grease) may provide adhesion of the cartridge to the electrode array.

Disposable cartridges for microfluidic processing and analysis in an automated system for carrying out molecular diagnostic analysis are disclosed in WO 2006/125767 A1 (see US 2009/0298059 A1 for an English translation). The cartridge is configured as a flat chamber device (with about the size of a check card) and can be inserted into the system. A sample can be pipetted into the cartridge through a port.

OBJECTS AND SUMMARY OF THE PRESENT INVENTION

It is an object of the present invention to suggest an alternative digital microfluidics system or digital microfluidics device which is configured to accommodate one or more disposable cartridges for manipulating samples in liquid droplets therein.

This object is achieved in that a digital microfluidics system for manipulating samples in liquid droplets within disposable cartridges is proposed. Such a disposable cartridge preferably contains a bottom layer, a top layer, and a gap between the bottom and top layers. The digital microfluidics system according to the present invention comprises:

(a) a base unit with at least one cartridge accommodation site that is configured for taking up a disposable cartridge;

(b) at least one electrode array substantially extending in a first plane and comprising a number of individual electrodes, said at least one electrode array being located at said cartridge accommodation site(s) of the base unit, and said electrode array being supported by a bottom substrate;

(c) at least one cover plate with a top substrate, the at least one cover plate being located at said cartridge accommodation site(s); and (d) a central control unit for controlling the selection of the individual electrodes of said at least one electrode array and for providing these electrodes with individual voltage pulses for manipulating liquid droplets within said cartridges by electrowetting, wherein the at least one cover plate further comprises an electrically conductive material that extends in a second plane and substantially parallel to the electrode array of the cartridge accommodation site the at least one cover plate is assigned to.

Preferably, the electrically conductive material of the cover plate is not connected with a source of a certain electrical potential. Alternatively, the electrically conductive material of the cover plate is grounded, but located external to the cartridge. In a further alternative embodiment, a conductive foil is attached to the cartridge.

According to a first preferred variant of the cartridge accommodation site, the cover plate is configured to be movable with respect to the electrode array of the respective cartridge accommodation site. According to a second preferred variant, the cartridge accommodation sites are configured for receiving a slidingly inserted disposable cartridge that is movable in a direction substantially parallel with respect to the electrode array of the respective cartridge accommodation site.

It is a further object of the present invention to suggest an alternative disposable cartridge for manipulating samples in liquid droplets digital using a microfluidics system or device into which one or more such disposable cartridges for manipulating samples in liquid droplets therein can be inserted.

This further object is achieved in that a disposable cartridge for use in a digital microfluidics system is proposed. The disposable cartridge according to the present invention comprises is characterized in that the bottom layer and the top layer comprise a hydrophobic surface that is exposed to the gap of the cartridge, and in that the cartridge does not have a conductive layer.

It is yet a further object of the present invention to suggest an alternative method for manipulating samples in liquid droplets digital in a microfluidics system or device.

This further object is achieved in that a method for manipulating samples in liquid droplets that adhere to a hydrophobic surface is proposed. The method according to the present invention comprises the steps of:

(a) providing a first hydrophobic surface, which is located substantially parallel above an electrode array; said electrode array substantially extending in a first plane, comprising a number of individual electrodes, being supported by a bottom substrate, and being connected to a central control unit for controlling the selection of individual electrodes of said electrode array and for providing these electrodes with individual voltage pulses for manipulating said liquid droplets on said first hydrophobic surface by electrowetting;

(b) providing a second hydrophobic surface substantially parallel to and in a distance to said first hydrophobic surface, thus forming a gap between the first and second hydrophobic surfaces;

(c) providing a cover plate with a top substrate, the cover plate also comprising an electrically conductive material that extends in a second plane and substantially parallel to the electrode array.

Preferably, the electrically conductive material of the cover plate is not connected with a source of a certain electrical potential during manipulating samples in liquid droplets. Alternatively, the cover plate is grounded, but external to the cartridge.

Additional and inventive features and preferred embodiments and variants of the digital microfluidics system, the disposable cartridge, and the method for manipulating samples in liquid droplets derive from the respective dependent claims.

Advantages of the present invention comprise:

Not connecting the electrically conductive material of the cover plate with a source of a certain electrical potential during manipulating samples in liquid droplets enables more simple construction of a movable or fixed top plate.

The conductive layer preferably is removed from the cartridge's top film or top layer respectively. Thus, without having any conductive layers that would contribute to electrowetting movements of the liquid droplets manipulated, the self-contained disposable cartridge according to the invention can be of very simple and low-cost construction.

BRIEF INTRODUCTION OF THE DRAWINGS

Figure 2:
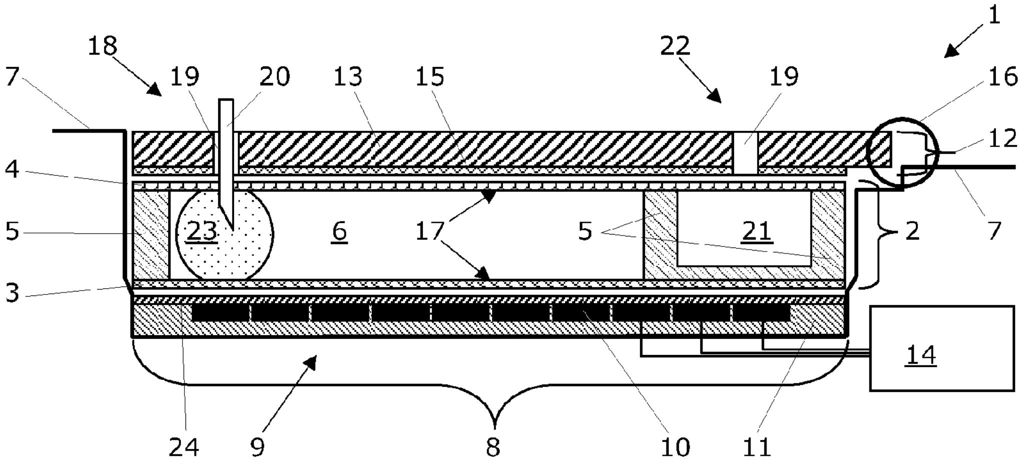
Figure 3:
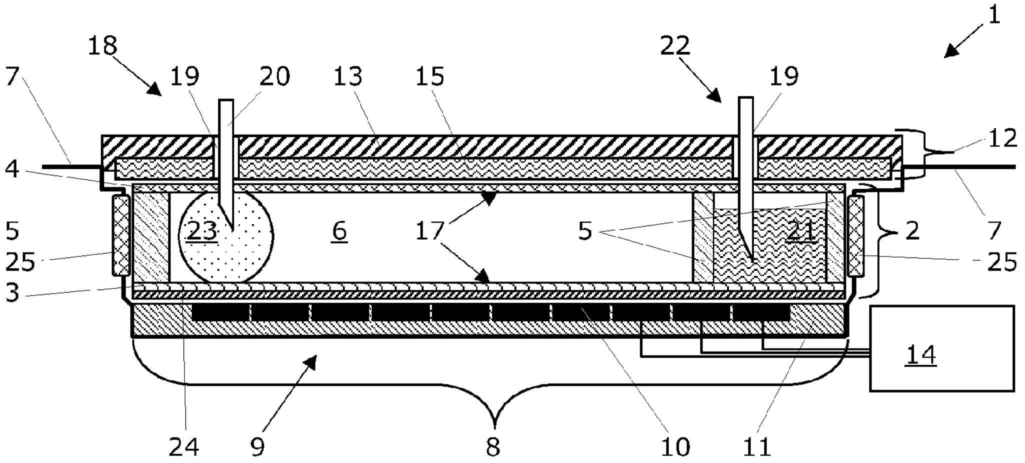
Figure 4A:
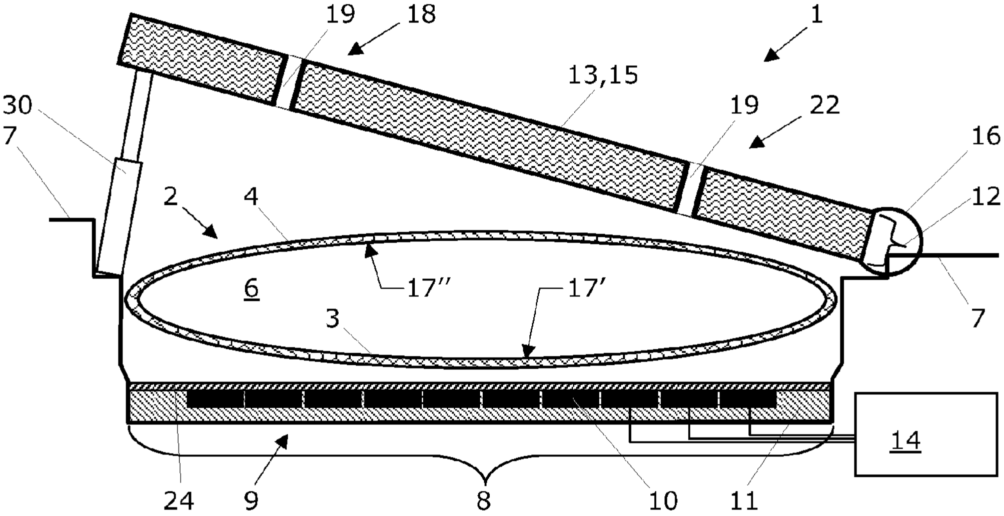
Figure 4B:
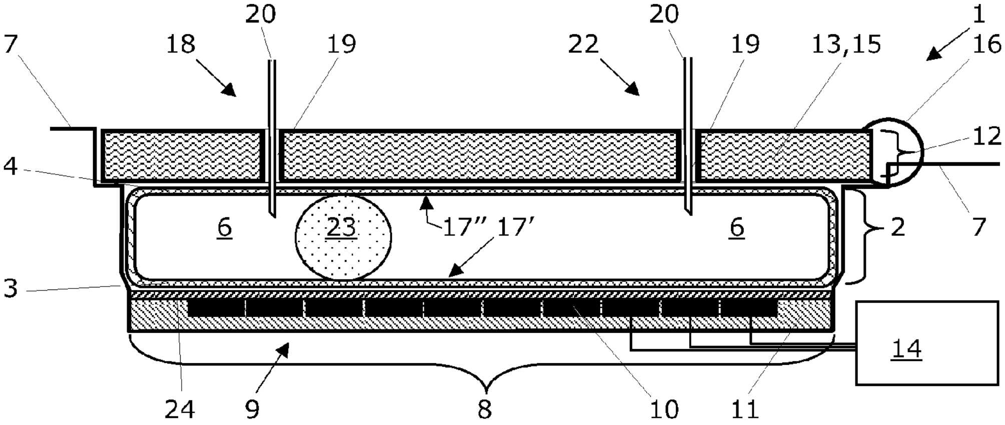
Figure 5:
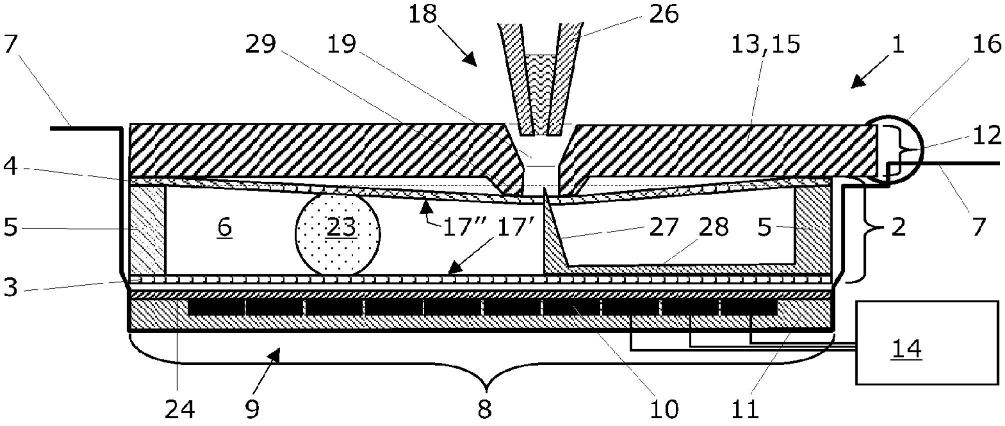
Figure 6:
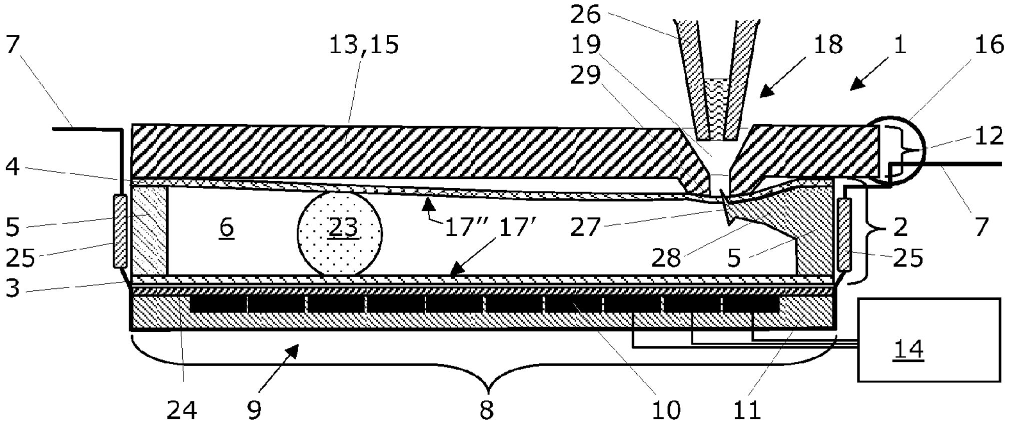
Figure 7:
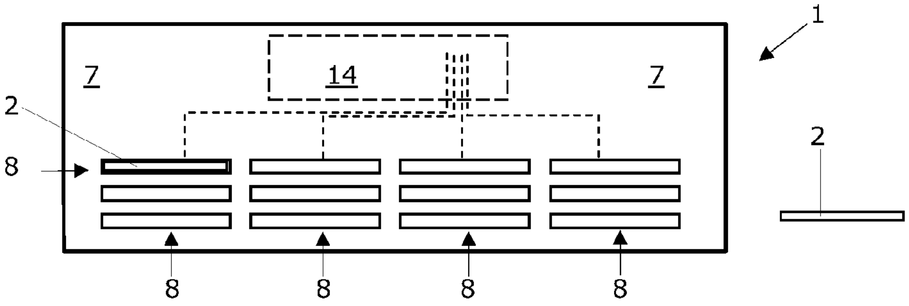
Figure 8A:
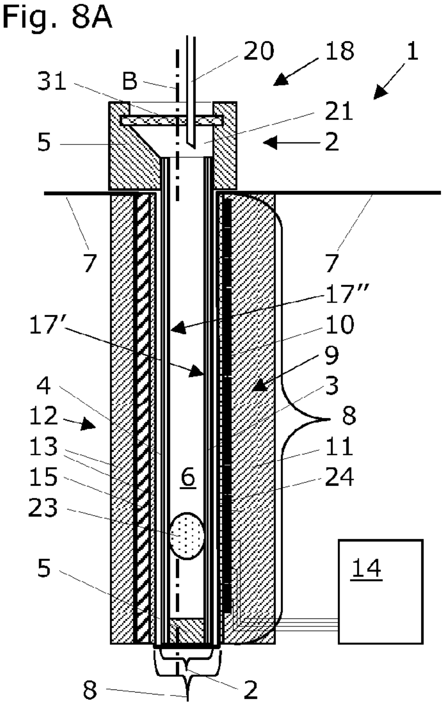
Figure 8B:
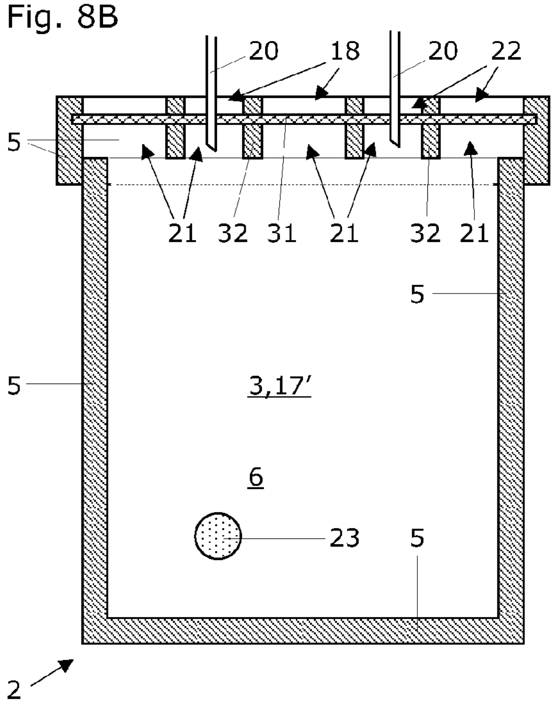

The digital microfluidics system, the self-contained disposable cartridge, and the method for manipulating samples according to the present invention are explained with the help of the attached schematic drawings that show selected and exemplary embodiments of the present invention without narrowing the scope and gist of this invention. It is shown in:

FIG. 1 an overview over a digital microfluidics system that is equipped with a central control unit and a base unit, with four cartridge accommodation sites that each comprise an electrode array, and a movable cover plate;

FIG. 2 a section view of one cartridge accommodation site with a disposable cartridge according to a first embodiment accommodated therein;

FIG. 3 a section view of one cartridge accommodation site with a disposable cartridge according to a second embodiment accommodated therein;

FIGS. 4A and 4B section views of one cartridge accommodation site with a disposable cartridge according to a third embodiment accommodated therein, wherein:

FIG. 4A shows the cushion-like cartridge as laid into a cartridge accommodation site with a partly closed cover, and FIG. 4B shows the cushion-like cartridge as pressed into operation shape inside the cartridge accommodation site by the entirely closed cover;

FIG. 5 a section view of one cartridge accommodation site with a disposable cartridge according to a fourth embodiment accommodated therein;

FIG. 6 a section view of one cartridge accommodation site with a disposable cartridge according to a fifth embodiment accommodated therein;

FIG. 7 an overview over a digital microfluidics system that is equipped with a central control unit and a base unit, with twelve cartridge accommodation sites that each comprise an electrode array and a fixed cover plate;

FIGS. 8A and 8B section views of one cartridge accommodation site with a disposable cartridge according to a sixth embodiment accommodated therein, wherein:

FIG. 8A shows a top-entry cartridge inserted into a substantially vertical cartridge accommodation site with a substantially vertical electrode array and cover plate, and FIG. 8B shows the top-entry cartridge as viewed from the section plane B indicated in FIG. 8A.

DETAILED DESCRIPTION OF THE PRESENT INVENTION

The FIG. 1 shows an overview over an exemplary digital microfluidics system 1 that is equipped with a central control unit 14 and a base unit 7, with four cartridge accommodation sites 8 that each comprise an electrode array 9, and a cover plate 12. The digital microfluidics system 1 is configured for manipulating samples in liquid droplets 23 within disposable cartridges 2 that contain a bottom layer 3, a top layer 4, and eventually a spacer 5 that defines a gap 6 between the bottom and top layers 3,4. Accordingly, the samples in liquid droplets 23 are manipulated in the gap 6 of the disposable cartridge 2.

According to the present invention, the digital microfluidics system 1 comprises a base unit 7 with at least one cartridge accommodation site 8 that is configured for taking up a disposable cartridge 2. The digital microfluidics system 1 can be a stand alone and immobile unit, on which a number of operators is working with cartridges 2 that they bring along. The digital microfluidics system 1 thus may comprise a number of cartridge accommodation sites 8 and a number of electrode arrays 9, so that a number of cartridges 2 can be worked on simultaneously and/or parallel. The number of cartridge accommodation sites 8, electrode arrays 9, and cartridges 2 may be 1 or any number between e.g. 1 and 100 or even more; this number e.g. being limited by the working capacity of the central control unit 14.

It may be preferred to integrate the digital microfluidics system 1 into a liquid handling workstation or into a Freedom EVO® robotic workstation, so that a pipetting robot can be utilized to transfer liquid portions and/or sample containing liquids to and from the cartridges 2.

Alternatively, the system 1 can be can be configured as a hand held unit which only comprises and is able to work with a low number, e.g. a single disposable cartridge 2. Every person of skill will understand that intermediate solutions that are situated in-between the two extremes just mentioned will also operate and work within the gist of the present invention.

According to the present invention, the digital microfluidics system 1 also comprises at least one electrode array 9 that substantially extends in a first plane and that comprises a number of individual electrodes 10. Such an electrode array 9 is located at each one of said cartridge accommodation sites 8 of the base unit 7. Preferably each electrode array 9 is supported by a bottom substrate 11, which bottom substrate 11 is fixed to the base unit 7. It is noted that the expressions "electrode array", "electrode layout", and "printed circuit board (PCB)" are utilized herein as synonyms.

According to the present invention, the digital microfluidics system 1 also comprises at least one cover plate 12 with a top substrate 13. In each case, at least one cover plate 12 is located at said cartridge accommodation sites 8. The top substrate 13 of the cover plate 12 and the bottom substrate 11 with the electrode array 9 or PCB define a space or cartridge accommodation site 8 respectively. In a first variant (see the two cartridge accommodation sites 8 in the middle of the base unit 7), the cartridge accommodation sites 8 are configured for receiving a slidingly inserted disposable cartridge 2 that is movable in a direction substantially parallel with respect to the electrode array 9 of the respective cartridge accommodating site 8. Such front- or top-loading can be supported by a drawing-in automatism that, following a partial insertion of a disposable cartridge 2, transports the cartridge 2 to its final destination within the cartridge accommodation site 8, where the cartridge 2 is precisely seated. Preferably, these cartridge accommodation sites 8 do not comprise a movable cover plate 12. After carrying out all intended manipulations to the samples in liquid droplets, the used cartridges 2 can be ejected by the drawing-in automatism and transported to an analysis station or discarded.

In a second variant (see the two cartridge accommodation sites 8 on the right and left of the base unit 7), the cartridge accommodation sites 8 comprise a cover plate 12 that is configured to be movable with respect to the electrode array 9 of the respective cartridge accommodating site 8. The cover plate 12 preferably is configured to be movable about one or more hinges 16 and/or in a direction that is substantially normal to the electrode array 9.

According to the present invention, the digital microfluidics system 1 also comprises a central control unit 14 for controlling the selection of the individual electrodes 10 of said at least one electrode array 9 and for providing these electrodes 10 with individual voltage pulses for manipulating liquid droplets within said cartridges 2 by electrowetting. As partly indicated in FIG. 1, every single individual electrode 10 is operatively connected to the central control unit 14 and therefore can be independently addressed by this central control unit 14, which also comprises the appropriate sources for creating and providing the necessary electrical potentials in a way known in the art.

The at least one cover plate 12 further comprises an electrically conductive material 15 that extends in a second plane and substantially parallel to the electrode array 9 of the cartridge accommodation site 8 the at least one cover plate 12 is assigned to. This electrically conductive material 15 of the cover plate 12 preferably is configured to be connected to a source of an electrical ground potential. This conductive material 15 contributes to the electrowetting movements of the liquid droplets manipulated in the digital microfluidics system 1.

The applicants of the current invention surprisingly found that the conductive material 15 also contributes to the electrowetting movements of the liquid droplets manipulated in the digital microfluidics system 1, if there is no connection between the conductive material 15 of the cover plate 12 and any source of a certain electrical (e.g. ground) potential. Thus, the cover plate 12 can be configured to be movable in any arbitrary direction and no electrical contacts have to be taken in into consideration when selecting a particularly preferred movement of the cover plate 12. Thus, the cover plate 12 may be configured to be also movable in a direction substantially parallel to the electrode array 9 and for carrying out a linear, circular or any arbitrary movement with respect to the respective electrode array 9 of the base unit 7.

The FIG. 2 shows a section view of one exemplary cartridge accommodation site 8 with a disposable cartridge 2 according to a first embodiment accommodated therein. The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). The electrically conductive material 15 of the cover plate 12 is configured as a thin metal plate or metal foil that is attached to the top substrate 13.

Alternatively, the electrically conductive material 15 of the cover plate 12 is configured as a metal layer that is deposited onto the top substrate 13. Such deposition of the conductive material 15 may be carried out by chemical or physical vapor deposition techniques as they are known per se.

The cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into the perfect position on the electrode array 9 with respect to a piercing facility 18 of the cover plate 12. This piercing facility 18 is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown).

In this case, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here at least partially is configured as a body that includes compartments 21 for reagents needed in an assay that is applied to the sample droplets in the gap 6.

The FIG. 3 shows a section view of one exemplary cartridge accommodation site 8 with a disposable cartridge 2 according to a second embodiment accommodated therein. Different to the previous embodiment, the cover plate 12 is mechanically connected with the base unit 7 of the digital microfluidics system 1 and immovably fixed therewith. The electrically conductive material 15 of the cover plate 12 is configured as a thick metal plate that is attached to the top substrate 13. Here, the cover plate 12 is not configured to apply a force to the disposable cartridge 2 that is accommodated at the cartridge accommodation site 8 of the base unit 7; thus, the cover plate 12 stays in place and a disposable cartridge 2 can be placed on the cartridge accommodation site 8 via front-entry loading. Such front-entry loading usually includes a movement of the disposable cartridge 2 in a direction that is parallel to the electrode array 9 (see FIG. 1). In order to enable proper drawing-in of the disposable cartridge 2 and to neatly position the cartridge at the accommodation site 8, the base unit 7 preferably is equipped with insertion guides 25. These insertion guides 25 preferably are from a self-lubricating plastic material, such as tetrafluorethylene and preferably leave a space between them that is just sufficient for slidingly inserting the disposable cartridge 2. Alternatively the electrically conductive material 15 of the cover plate 12 is configured as a metal plate, a metal foil, or a metal layer that is sandwiched between materials of the top substrate 13 (see FIG. 8A).

The disposable cartridge 2 of FIG. 3 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. As a difference to the one depicted in FIG. 2, this cartridge 2 has dielectric layer 24 that is attached to or forms a part of the bottom layer 3. Thus, the bottom layer 3 is covered by a dielectric layer 24 or the bottom layer 3 itself is made from a dielectric material. In consequence, the electrode array 9 does not need to have such a dielectric layer 24. The spacer 5 of the cartridge 2 here at least partially is configured as a body that includes compartments 21 for reagents needed in an assay that is applied to the sample droplets in the gap 6. In this case, the electrode array 9 is covered by a dielectric layer 24.

The electrode array 9 is fixed to a bottom substrate 11 and every individual electrode 10 is electrically and operationally connected with the central control unit 14 (only three connections of the ten electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The cover plate 12 also includes a piercing facility 18 that is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2. The piercing pipette tip 20 may be a part of a handheld pipette (not shown) or of a pipetting robot (not shown). The cover plate 12 here comprises additional piercing facilities 22 for a piercing pipette tip 20 to be pushed through a through hole 19 that penetrates the cover plate 12, to pierce the top layer 4 of the cartridge 2 and to withdraw reagent portions from the compartments 21 and for introducing said reagent portions into the gap 6 of the cartridge 2. Here, the compartment 21 is configured as a cutout in the body of the spacer 5, the cutout being closed by the bottom layer 3 and top layer 4.

The FIG. 4 shows section views of one exemplary cartridge accommodation site 8 with a disposable cartridge 2 according to a third embodiment accommodated therein. The electrode array 9 is fixed to a bottom substrate 11 and every individual electrode 10 is electrically and operationally connected with the central control unit 14 (only three connections of the ten electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). Here, the electrically conductive material 15 of the cover plate 12 is made of metallic conductive material and comprises both the top substrate 13 and the electrically conductive material 15 as a single integrated part. Alternatively, the electrically conductive material 15 of the cover plate 12 is configured as compound, such as titanium indium oxide (TIO) or a plastic material with electrically conductive filler materials that is attached or integrated into the top substrate 13 (not shown). In both cases, it may be preferred that the electrically conductive material 15 is covered by a plastic layer (not shown); the material of this plastic layer preferably being selected from a group comprising polypropylene and polyamide. Automatic opening and closing of the cover plate 12 may be achieved by a closing means 30.

The cover plate 12 also includes a piercing facility 18 that is configured for introducing sample droplets into the gap 6 of the cartridge 2. The piercing facility 18 is configured as a through hole 19 that leads across the entire cover plate 12 and that enables a piercing pipette tip 20 to be pushed through and pierce the top layer 4 of the cartridge 2 (see FIG. 4B). The piercing pipette tip 20 may be a part of a handheld pipette (not shown) or of a pipetting robot (not shown). The cover plate 12 here comprises additional piercing facilities 22 for a piercing pipette tip 20 to be pushed through a through hole 19 that penetrates the cover plate 12, to pierce the top layer 4 of the cartridge 2 and to withdraw e.g. silicon oil from the gap 6 of the cartridge 2 (see FIG. 4B).

FIG. 4A shows the cushion-like cartridge 2 as laid into a cartridge accommodation site 8 of a base unit 7 of digital microfluidics system 1 *a* with a partly closed cover plate 12. This disposable cartridge 2 comprises a bottom layer 3 and a top layer 4, but no spacer that would define a gap 6 between the bottom and top layers 3,4 for manipulating samples in liquid droplets 23 in this gap 6. The bottom layer 3 and the top layer 4 comprise a hydrophobic surface 17',17" that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. Like the one depicted in FIG. 2, this cartridge 2 has no dielectric layer attached to or forms a part of the bottom layer 3. In consequence, the electrode array 9 does need to have such a dielectric layer 24. This cartridge 2 without spacer is configured as a sack or pillow that preferably is filled with silicon oil, other oils or another chemically substantially inert material that is not miscible with water, such as hexadecane.

FIG. 4B shows the cushion-like cartridge 2 as pressed into operation shape inside the cartridge accommodation site 8 by the entirely closed cover plate 12. As long as the cover plate 12 at least partially is open (see FIG. 4A), the cushion-like or sack-like cartridge 2 may take a shape that is mainly due to the forces that the preferred oil filling is exerting to the membrane bag or sack of the cartridge 2. Handling (inserting into and taking out from the accommodation site 8) the cartridge 2 preferably is performed with a robotized suction device (not shown). When pressed into operation shape however (se FIG. 4B), the cushion-like or sack-like cartridge 2 is urged into a shape that conforms to the inner space of the cartridge accommodation site 8 of the base unit 7. Thus, without any need for providing a spacer, the top layer 4 is orientated substantially parallel and in a defined distance to the bottom layer 3 and to the electrode array 9 below the latter.

In order to avoid leakage or spilling of oil during or after piercing the pillow-like cartridge 2, the top layer 4 of the cartridge 2 may be configured as a self-sealing pierceable membrane. Alternatively or in combination with a self-sealing pierceable top layer 4, the cover plate 12 may be equipped with a self-sealing pierceable membrane at least in the region of the piercing facilities 18,22. Such a self-sealing pierceable membrane at least in the region of the piercing facilities 18,22 (not shown) preferably is placed onto the surface of the cover plate 12 that is contacting the cartridge 2.

The FIG. 5 shows a section view of one exemplary cartridge accommodation site 8 with a disposable cartridge 2 according to a fourth embodiment accommodated therein. The cover plate 12 is mechanically connected with the base unit 7 of the digital microfluidics system 1 via a hinge 16; thus, the cover plate 12 can swing open and a disposable cartridge 2 can be placed on the cartridge accommodation site 8 via top-entry loading (see FIG. 1). Here, the electrically conductive material 15 of the cover plate 12 is made of metallic conductive material and comprises both the top substrate 13 and the electrically conductive material 15 as a single integrated part. Alternatively, the electrically conductive material 15 of the cover plate 12 is configured as compound, such as titanium indium oxide (TIO) or a plastic material with electrically conductive filler materials that is attached or integrated into the top substrate 13 (not shown). In both cases, it may be preferred that the electrically conductive material 15 is covered by a plastic layer (not shown); the material of this plastic layer preferably being selected from a group comprising polypropylene and polyamide.

Also here, the cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into a defined position on the electrode array 9. In addition, a piercing facility 18 is provided: The disposable cartridge 2 according to this third embodiment comprises a piercing pin 27 that is located in the gap 6 of the cartridge 2 and that is configured for piercing the top layer 4 when the top layer 4 is displaced in a direction against the bottom layer 3. Preferably, the piercing pin 27 is attached to a pin plate 28, which pin plate 28 is connecting the piercing pin 27 with a part of the spacer 5 of the disposable cartridge 2. The cover plate 12 further comprises a through hole 19 that leads across the entire cover plate 12 and that is located in register with the piercing pin 27 of a properly positioned disposable cartridge 2 seated at the cartridge accommodation site 8. The cover plate 12 further comprises a displacement portion 29, which protrudes from the cover plate 12 for displacing the top layer 4 in a direction against the bottom layer 3. This displacement portion 29 is configured to cooperate with the piercing pin 27 when piercing the top layer 4. Thus, by utilization of this piercing facility 18, sample droplets and/or reagent portions may be introduced into the gap 6 of the cartridge 2. A portion of the through hole 19 preferably is widened such that a disposable pipette tip 26 may be used for pipetting sample droplets and/or reagent portions to the gap 6 of the disposable cartridge 2. The disposable pipette tip 26 may be a part of a handheld pipette (not shown) or of a pipetting robot (not shown).

In this case, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

Like in the already introduced first and second embodiments, the disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The $1^{st}$ hydrophobic surface 17' is located on the inside of the bottom layer 3, and the $2^{nd}$ hydrophobic surface 17" is located on the inside of the top layer 4. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here does not deed to be configured as a body that includes compartments 21 for reagents needed in an assay that is applied to the sample droplets in the gap 6, because these reagents could be added to the gap 6 by conventional pipetting with a handheld pipette or with a pipetting robot (see above).

The FIG. 6 shows a section view of one exemplary cartridge accommodation site 8 with a disposable cartridge 2 according to a fifth embodiment accommodated therein. Similar to the previous embodiment, the cover plate 12 is mechanically connected with the base unit 7 of the digital microfluidics system 1 by a hinge 16. In order to enable proper top-loading of the disposable cartridge 2 and to neatly position the cartridge at the accommodation site 8, the base unit 7 preferably is equipped with insertion guides 25. These insertion guides 25 preferably are from a self-lubricating plastic material, such as tetrafluorethylene and preferably leave a space between them that is just sufficient for slidingly inserting the disposable cartridge 2. Also similar to the previous embodiment and as a first alternative solution, the electrically conductive material 15 of the cover plate 12 is made of metallic conductive material and comprises both the top substrate 13 and the electrically conductive material 15 as a single integrated part. Alternatively, the electrically conductive material 15 of the cover plate 12 is configured as compound, such as titanium indium oxide (TIO) or a plastic material with electrically conductive filler materials that is attached or integrated into the top substrate 13 (not shown). In both cases, it may be preferred that the electrically conductive material 15 is covered by a plastic layer (not shown); the material of this plastic layer preferably being selected from a group comprising polypropylene and polyamide.

Also here, the cover plate 12 is configured to apply a force to a disposable cartridge 2 that is accommodated at the cartridge accommodation site 8 of the base unit 7. This force urges the disposable cartridge 2 against the electrode array 9 in order to position the bottom layer 3 of the cartridge as close as possible to the surface of the electrode array 9. This force also urges the disposable cartridge 2 into a defined position on the electrode array 9. In addition, a piercing facility 18 is provided: The disposable cartridge 2 according to this third embodiment comprises a piercing pin 27 that is located in the gap 6 of the cartridge 2 and that is configured for piercing the top layer 4 when the top layer 4 is displaced in a direction against the bottom layer 3. Preferably, the piercing pin 27 is attached to a pin plate 28, which pin plate 28 is connecting the piercing pin 27 with a part of the spacer 5 of the disposable cartridge 2. The cover plate 12 further comprises a through hole 19 that leads across the entire cover plate 12 and that is located in register with the piercing pin 27 of a properly positioned disposable cartridge 2 seated at the cartridge accommodation site 8. The cover plate 12 further comprises a displacement portion 29, which protrudes from the cover plate 12 for displacing the top layer 4 in a direction against the bottom layer 3. This displacement portion 29 is configured to cooperate with the piercing pin 27 when piercing the top layer 4. Thus, by utilization of this piercing facility 18, sample droplets and/or reagent portions may be introduced into the gap 6 of the cartridge 2. A portion of the through hole 19 preferably is widened such that a disposable pipette tip 26 may be used for pipetting sample droplets and/or reagent portions to the gap 6 of the disposable cartridge 2. The disposable pipette tip 26 may be a part of a handheld pipette (not shown) or of a pipetting robot (not shown).

In this case, the electrode array 9 is covered by a dielectric layer 24. The electrode array 9 is fixed to a bottom substrate 11 and every individual electrode 10 is electrically and operationally connected with the central control unit 14 (only three connections of the ten electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

Like in the already introduced first, second, and fourth embodiment, the disposable cartridge 2 comprises a bottom layer 3, a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17 that is exposed to the gap 6 of the cartridge 2. The $1^{st}$ hydrophobic surface 17' is located on the inside of the bottom layer 3, and the $2^{nd}$ hydrophobic surface 17" is located on the inside of the top layer 4. The bottom layer 3 and the top layer 4 of the cartridge 2 are entirely hydrophobic films or at least comprise a hydrophobic surface that is exposed to the gap 6 of the cartridge 2. It is clear from this FIG. 2, that the cartridge 2 does not have a conductive layer. The spacer 5 of the cartridge 2 here does not deed to be configured as a body that includes compartments 21 for reagents needed in an assay that is applied to the sample droplets in the gap 6, because these reagents could be added to the gap 6 by conventional pipetting with a handheld pipette or with a pipetting robot (see above).

It is noted that the piercing pin 27 of the fourth embodiment (see FIG. 5) of the inventive disposable cartridge 2 is placed with its back on the $1^{st}$ hydrophobic surface of the bottom layer 3. Thus, the bottom substrate 11 and the electrode array 9 provide stability to the piercing pin 27 when the top layer 4 is displaced by the displacement portion 29 of the cover plate 12. In consequence, the pin plate 28 can be very thin. Alternatively, the pin plate 28 is omitted and the piercing pin 27 is glued to the $1^{st}$ hydrophobic surface of the bottom layer 3. Only gluing such a small piercing pin 27 to the inner surface of the bottom layer 3 has the advantage that more of the individual electrodes 10 can be used for electrowetting. Another advantage is that the position of the piercing pin 27 (and also of the through hole 19 in the cover plate 12 of course) can be arbitrarily chosen in any distance to the spacer 5. However, exact positioning of the piercing pin 27 may be somewhat cumbersome during mass production of the disposable cartridges 2.

In contrast, the piercing pin 27 of the fifth embodiment of the inventive disposable cartridge 2 (see FIG. 6) is placed much closer to the spacer 5 with which it is connected by a self-supporting pin plate 28. Thus, the spacer 6 provides stability to the piercing pin 27 when the top layer 4 is displaced by the displacement portion 29 of the cover plate 12. Advantageously, the electrode array 9 is not involved or affected by the piercing process and all of the individual electrodes 10 can be used for electrowetting. It is preferred to add a so-called weather groove to the lower part of the piecing pin 27 (see FIG. 6) if draining the pipetted liquid down to the 1st hydrophobic surface 17' along the self-supporting pin plate 28 should be avoided. If such draining down however is preferred, adding of such a weather groove can be omitted.

The FIG. 7 shows an overview over a digital microfluidics system 1 that is equipped with a central control unit 14 and a base unit 7, with twelve cartridge accommodation sites 8 that each comprise an electrode array 9 and a fixed cover plate 12. This base unit 7 is particularly suited for taking up cartridges 2 according to a sixth embodiment and loading these cartridges into substantially vertical cartridge accommodation sites 8 with a substantially vertical electrode array 9 and cover plate 12 (see FIG. 8). Such loading preferably is carried out by a robotized gripping device of a liquid handling workstation (not shown).

The FIG. 8 shows section views of one exemplary cartridge accommodation site 8 of a base unit 7 of digital microfluidics system 1 with a disposable cartridge 2 according to a sixth embodiment accommodated therein. It is immediately clear from the FIG. 8A, that a top-entry cartridge 2 is inserted into a substantially vertical cartridge accommodation site 8 with a substantially vertical electrode array 9 and cover plate 12. This disposable cartridge 2 comprises a bottom layer 3 and a top layer 4, and a spacer 5 that defines a gap 6 between the bottom and top layers 3,4 for manipulating samples in liquid droplets 23 in this gap 6. The bottom layer 3 and the top layer 4 comprise a hydrophobic surface 17',17" that is exposed to the gap 6 of the cartridge 2. The bottom layer 3 and the top layer 4 of the cartridge 2 are entirely hydrophobic films or at least comprise a hydrophobic surface that is exposed to the gap 6 of the cartridge 2. Like the one depicted in FIG. 2, this cartridge 2 has no dielectric layer attached to or forms a part of the bottom layer 3. In consequence, the electrode array 9 does need to have such a dielectric layer 24. This cartridge 2 preferably is filled with silicon oil.

The electrode array 9 is fixed to a bottom substrate 11 and every individual electrode 10 is electrically and operationally connected with the central control unit 14 (only four connections of the fourteen electrodes 10 are drawn here). The digital microfluidics system 1 is configured for manipulating samples in liquid droplets 23 within disposable cartridges 2 that contain a gap 6. Accordingly, the samples in liquid droplets 23 are manipulated in the gap 6 of the disposable cartridge 2.

The cover plate 12 is mechanically connected with or entirely integrated into the base unit 7 of the digital microfluidics system 1 and is not movable. Thus, a disposable cartridge 2 can be inserted into the cartridge accommodation site 8 via top-entry loading (see FIG. 7). Here, the electrically conductive material 15 of the cover plate 12 is made of metallic conductive material and is sandwiched between material of the top substrate 13. Alternatively, the electrically conductive material 15 of the cover plate 12 may be covered by a plastic layer instead or additional to the material of the top substrate 13 (not shown).

The spacer 5 also includes a piercing facility 18 that is configured for introducing sample droplets into the gap 6 of the cartridge 2. The piercing facility 18 is configured as an enlarged portion of the spacer 5. This enlarged spacer portion preferably is equipped with a pierceable, self-sealing membrane 31 that enables a piercing pipette tip 20 to be pushed through. The piercing pipette tip 20 may be a part of a handheld pipette (not shown) or of a pipetting robot (not shown). Automated delivery of liquids to or withdrawal of liquids from the gap 6 of the cartridge 2 is simplified by the relatively large piercing area provided by this enlarged spacer portion of the cartridge 2. Assuming a gap width of about 1-3 mm, the width of this piercing area preferably is about 5-10 mm and therefore has about the size of a well of 96-well microplate, which easily can be reached by an automated pipettor of a liquid handling system or of a liquid handling workstation. The same time as providing space for compartments 21 (see also FIG. 8B), the enlarged spacer portion of the cartridge 2 also provides gripping surfaces for being gripped by an automated robot gripper (not shown) that is preferably utilized for handling the cartridges outside of the digital microfluidics system 1 and for inserting and withdrawal of the cartridges 2 from their accommodation sites 8. In addition, the enlarged spacer portion of the cartridge 2 provides an abutting surface that abuts the surface of the base unit 7 when the cartridge 2 is correctly accommodated in the accommodation site 8.

It is preferred that the electrode array 9 extends to the foremost position with respect to the surface of the base unit 7 in order to be able to move liquid droplets 23 from a compartment 21 to a distinct position on the printed circuit board (PCB) or electrode array 9. Also moving liquid droplets 23 in the opposite direction from a reaction site on the electrode array 9 to a compartment 21 is greatly preferred, especially in the case if a reaction product shall be analyzed outside of the digital microfluidics system 1 and also outside of the cartridge 2.

FIG. 8B shows the top-entry cartridge 2 of FIG. 8A as viewed from the section plane B indicated in FIG. 8A. The section runs through the gap 6 and between the bottom layer 3 and the top layer 4 of the self-containing, disposable cartridge 2. The section also crosses the spacer 5, of which a U-shaped part is located between the bottom and top layers 3,4 and an enlarged spacer portion is provided around the U-shaped part and the bottom and top layers 3,4. Preferably, the U-shaped part of the spacer 5 is of plastic material (preferably injection molded) and glued or fused to the bottom and top layers 3,4. It is preferred that the enlarged spacer portion also is produced by injection molding; this enables the provision of separating bars 32 that on the one hand create the compartments 21 below the pierceable membrane 31, and that on the other hand stabilize the pierceable membrane 31. Such stabilization preferably is provided by back-injection molding the separating bars 32 and the enlarged spacer portion to the pierceable membrane 31. Preferably, the enlarged spacer portion then is imposed on the U-shaped part of the spacer 5 with the bottom and top layers 3,4.

As already pointed out, the spacer 5 also includes a piercing facility 18 that is configured as an enlarged portion of the spacer 5. This enlarged spacer portion preferably is equipped with a pierceable self-sealing membrane 31 that enables a piercing pipette tip 20 to be pushed through. The piercing pipette tip 20 may be a part of a handheld pipette (not shown) or of a pipetting robot (not shown). The spacer 2 here comprises additional piercing facilities 22 for a piercing pipette tip 20 to be pushed through the self-sealing membrane 31 and to withdraw e.g. silicon oil from the gap 6 of the cartridge 2. In the cartridge 2 of this FIG. 8B, a liquid droplet 23 (e.g. a sample) was introduced by the piercing pipette tip 20 at the piercing facility 18 and then moved on the hydrophobic surface 17' of the bottom layer 3 to the actual position. Simultaneously with introducing the liquid droplet 23 into the compartment 21 and into the gap 6, a similar amount of silicon oil (or any other chemically inert liquid that will not mix with the liquid droplet 23) is withdrawn from the respective compartment 21 at the additional piercing facility 22. Alternative to such simultaneous balancing of liquids in the gap 6, removing of the expected quantity of oil or inert liquid can be carried out shortly before or after the insertion of the liquid droplet 23. The compartments 21 also may serve as reservoirs for storing more liquid than necessary for producing a movable liquid droplet 23 from this liquid; in consequence, a number of such droplets 23 may be produced from a single liquid volume once introduced into at least one of the compartments 21. It is advisable however, to set aside one compartment 21, for withdrawal of oil or inert liquid, and to set aside another compartment 21 for withdrawal of reagent products.

According to an alternative and very simple embodiment (not shown), a disposable cartridge 2 that comprises a bottom layer 3 and top layer 4 with hydrophobic surfaces 17',17" that in each case are directed to the gap 6, can be mounted on a PCB for electrowetting. Instead of utilizing a cover plate 12 that is equipped with an electrically conductive material 15, an electrically conductive film (e.g. an aluminum foil) can be attached to the outer surface of the top layer 4. It turned out that such a conductive film enables electrowetting even when this conductive film in not grounded. Instead of attaching an un-grounded conductive film to the cartridge, the top layer 4 can have a thin film coating on its outer surface; the thin film coating can be of any metal and deposited by chemical or physical evaporation techniques. This thin conductive film on the outer surface of the top layer 4 can even by of conductive paint. It is thus proposed to provide an electrically conductive material 15 that extends in a second plane and substantially parallel to the electrode array 9, said electrically conductive material 15 being situated on the top layer 4 of the cartridge 2 and being not connected to a source of a distinct electrical potential during manipulating samples in liquid droplets 23.

A method for manipulating samples in liquid droplets 23 that adhere to a hydrophobic surface 17 is characterized that the method comprising the steps of providing a first hydrophobic surface 17' on a bottom layer 3 of a disposable cartridge 2. This bottom layer 3 is located substantially parallel above an electrode array 9 of a digital microfluidics system 1. Said electrode array 9 substantially extends in a first plane and comprises a number of individual electrodes 10 that are supported by a bottom substrate 11 of a base unit 7 of the digital microfluidics system 1. Said electrode array 9 is connected to a central control unit 14 of the digital microfluidics system 1 for controlling the selection of individual electrodes 10 of said electrode array 9 and for providing these electrodes 10 with individual voltage pulses for manipulating said liquid droplets 23 on said first hydrophobic surface 17' by electrowetting.

The inventive method also comprises the step of providing a second hydrophobic surface 17" substantially parallel to and in a distance to said first hydrophobic surface 17'. In this way, a gap 6 between the first and second hydrophobic surfaces 17',17" is formed. Preferably, such a gap 6 is defined by a spacer 5, to which the a bottom layer 3 that comprises the first hydrophobic surface 17' and a top layer 4 that comprises the second hydrophobic surface 17" are attached.

The inventive method further comprises providing a cover plate 12 with a top substrate 13. The cover plate 12 also comprises an electrically conductive material 15 that extends in a second plane and substantially parallel to the electrode array 9. It is especially preferred that the electrically conductive material 15 of the cover plate 12 is not connected to a source of a distinct electrical potential during manipulating samples in liquid droplets 23.

In all embodiments shown or discussed, it is preferred that the gap 6 of the disposable cartridge 2 is substantially filled with silicon oil. It is also always preferred that the bottom layer 3 and the top layer 4 of the cartridge 2 are entirely hydrophobic films or comprise a hydrophobic surface 17',17" that is exposed to the gap 6 of the cartridge 2. Following electrowetting and manipulating at least one liquid droplet 23 with the gap 6 of a disposable cartridge 2, the result of the manipulation or of the assay can be evaluated while the disposable cartridge 2 still is at the cartridge accommodation site 8, i.e. utilizing an analysis system of the digital microfluidics system 1 or of a workstation, the digital microfluidics system 1 is integrated into. Alternately, the disposable cartridges 2 can be taken out of the base unit 7 of the digital microfluidics system 1 and analyzed elsewhere.

After analysis, the disposable cartridges 2 can be disposed and the electrode array 9 can be reused. Because the components of the digital microfluidics system 1 never come into contact with any samples or reagents when working with the first or second embodiment of the inventive cartridge 2, such re-usage with other disposable cartridges 2 can be immediately and without any intermediate cleaning. Because the through hole 19 of the cover plate 12 of the digital microfluidics system 1 may come into contact with samples and reagents when working with the third or fourth embodiment of the inventive cartridge 2, such re-usage with other disposable cartridges 2 can be carried out after some intermediate cleaning or after replacement of the cover plates 12.

It is an aim of the present invention to provide removable and disposable films that separate the liquid droplets 23 from the electrode array 9 and from the top plate 12 during manipulation of the liquid droplets 23 by electrowetting. As shown in the six different embodiments of the self-containing disposable cartridge 2 presented in the above specification, the removable and disposable films preferably are provided as a bottom layer 3 and a top layer 4 of a cartridge 2.

In a preferred embodiment, the bottom layer 3 of the cartridge 2 is attracted to the PCB by vacuum. Small evacuation holes in the PCB are connected to a vacuum pump for this purpose. Applying such vacuum attraction to the bottom layer 3 enables avoiding the use of any liquids or adhesives for better contacting the bottom layer 3 of the cartridge 2 to the surface of the electrode array 9.

Any combination of the features of the different embodiments of the cartridge 2 disclosed herein that appear reasonable to a person of skill are comprised by the gist and scope of the present invention.

Even if they are not particularly described in each case, the reference numbers refer to similar elements of the digital microfluidics system 1 and disposable cartridge 2 of the present invention.

REFERENCE NUMBERS

| | |
|---|---|
| 1 | digital microfluidics system |
| 2 | disposable cartridge |

-continued

| | |
|---|---|
| 3 | bottom layer |
| 4 | top layer |
| 5 | spacer |
| 6 | gap between 3 and 4 |
| 7 | base unit |
| 8 | cartridge accommodation site |
| 9 | electrode array |
| 10 | individual electrode |
| 11 | bottom substrate |
| 12 | cover plate |
| 13 | top substrate |
| 14 | central control unit |
| 15 | electrically conductive material |
| 16 | hinge |
| 17 | hydrophobic surface |
| 17' | 1st hydrophobic surface |
| 17'' | 2nd hydrophobic surface |
| 18 | piercing facility |
| 19 | through hole |
| 20 | piercing pipette tip |
| 21 | compartment |
| 22 | additional piercing facility |
| 23 | liquid droplet |
| 24 | dielectric layer |
| 25 | insertion guide |
| 26 | disposable pipette tip |
| 27 | piercing pin |
| 28 | pin plate |
| 29 | displacement portion |
| 30 | closing means |
| 31 | pierceable membrane |
| 32 | separating bar |

What is claimed is:

1. A digital microfluidics system (1) for manipulating samples in liquid droplets, within disposable cartridges (2) that comprise a bottom layer (3), a top layer (4), and a gap (6) between the bottom and top layers (3,4); the digital microfluidics system (1) comprising:

(a) a base unit (7) with at least one cartridge accommodation site (8) that is configured for taking up a slidingly inserted disposable cartridge (2) which is movable in a direction substantially parallel with respect to an electrode array (9) of the respective cartridge accommodating site (8);

(b) at least one electrode array (9) being located at said cartridge accommodation site(s) (8) of the base unit (7), being supported by a bottom substrate (11), being substantially extending in a first plane and comprising a number of individual electrodes (10);

(c) at least one cover plate (12) with a top substrate (13), the at least one cover plate (12) being located at said cartridge accommodation site(s) (8) and being equipped with an electrically conductive material (15) that extends in a second plane and substantially parallel to the electrode array (9) of the cartridge accommodation site (8) the at least one cover plate (12) is assigned to, the electrically conductive material (15) of the cover plate (12) being not connected with a source of a certain electrical potential or grounded;

(d) the disposable cartridge (2) for manipulating samples in liquid droplets, the disposable cartridge (2) comprising:

a bottom layer (3), a top layer (4), and a gap (6) between the bottom and top layers (3,4), wherein the bottom layer (3) and the top layer (4) comprise a hydrophobic surface (17) that is exposed to the gap (6) of the cartridge (2), and at least one spacer (5) that defines the gap (6) between the bottom and top layers (3,4); and (e) a central control unit (14) for controlling the selection of the individual electrodes (10) of said at least one electrode array (9) and for providing these electrodes (10) with individual voltage pulses for manipulating liquid droplets within said cartridges (2) by electrowetting.

2. The digital microfluidics system (1) of claim 1, wherein the electrically conductive material (15) of the cover plate (12) is configured as a metal plate or foil that is attached to the top substrate (13) of the cover plate (12).

3. The digital microfluidics system (1) of claim 1, wherein the electrically conductive material (15) of the cover plate (12) is configured as a metal layer that is deposited onto the top substrate (13) of the cover plate (12).

4. The digital microfluidics system (1) of claim 1, wherein the electrically conductive material (15) of the cover plate (12) is configured as a plastic material with electrically conductive filler that is attached or integrated into the top substrate (13) of the cover plate (12).

5. The digital microfluidics system (1) of claim 1, wherein the cover plate (12) is made of metallic conductive material and comprises both the top substrate (13) and the electrically conductive material (15) as a single integrated part.

6. The digital microfluidics system (1) of one of the claims 1 to 5, wherein the electrically conductive material (15) of the cover plate (12) is covered by a plastic layer.

7. The digital microfluidics system (1) of claim 1, wherein the electrically conductive material (15) of the cover plate (12) is configured as a metal plate, a metal foil, or a metal layer that is sandwiched between materials of the top substrate (13).

8. The digital microfluidics system (1) of claim 1, wherein the disposable cartridge (2) does not have a conductive layer.

9. A digital microfluidics system (1) for manipulating samples in liquid droplets, within disposable cartridges (2) that comprise a bottom layer (3), a top layer (4), and a gap (6) between the bottom and top layers (3,4); the digital microfluidics system (1) comprising:

(a) a base unit (7) with at least one cartridge accommodation site (8) that is configured for taking up a slidingly inserted disposable cartridge (2) which is movable in a direction substantially parallel with respect to an electrode array (9) of the respective cartridge accommodating site (8);

(b) at least one electrode array (9) being located at said cartridge accommodation site(s) (8) of the base unit (7), being supported by a bottom substrate (11), being substantially extending in a first plane and comprising a number of individual electrodes (10);

(c) at least one cover plate (12) with a top substrate (13), the at least one cover plate (12) being located at said cartridge accommodation site(s) (8);

(d) the disposable cartridge (2) for manipulating samples in liquid droplets, the disposable cartridge (2) comprising:

a bottom layer (3), a top layer (4), and a gap (6) between the bottom and top layers (3,4), wherein the bottom layer (3) and the top layer (4) comprise a hydrophobic surface (17) that is exposed to the gap (6) of the cartridge (2), at least one spacer (5) that defines the gap (6) between the bottom and top layers (3,4); and an electrically conductive material (15) that is attached to an outer surface of the top layer (4) and that extends in a second plane and substantially parallel to the electrode array (9) of the cartridge accommodation site (8) the at least one cover plate (12) is assigned to, the electrically conductive material (15) being not connected with a source of a distinct electrical potential or grounded;

(e) a central control unit (14) for controlling the selection of the individual electrodes (10) of said at least one electrode array (9) and for providing these electrodes (10) with individual voltage pulses for manipulating liquid droplets within said cartridges (2) by electrowetting.

10. The digital microfluidics system (1) of claim 9, wherein said electrically conductive material (15) of the cartridge (2) is configured as an electrically conductive film or thin film coating on the outer surface of the top layer (4) of the disposable cartridge (2).

11. The digital microfluidics system (1) of claim 9, wherein the cover plate (12) is configured to be movable with respect to the electrode array (9) of the respective cartridge accommodating site (8).

12. The digital microfluidics system (1) of claim 9, wherein the cover plate (12) is configured to be movable about a hinge (16) and/or in a direction that is substantially normal to the electrode array (9).

13. The digital microfluidics system (1) of claim 9, wherein the cover plate (12) is configured to be movable in a direction substantially parallel to the electrode array (9).

14. The digital microfluidics system (1) of claim 13, wherein the cover plate (12) is configured to apply a force to a disposable cartridge (2) that is accommodated at the cartridge accommodation site (8) of the base unit (7), which force urges the disposable cartridge (2) against the electrode array (9).

15. The digital microfluidics system (1) of claim 9, wherein the cover plate (12) is configured to be fixed substantially parallel and in a distance to the electrode array (9).

16. The digital microfluidics system (1) of claim 9, wherein the cartridge accommodation sites (8) are configured for front-entry loading the disposable cartridge (2).

17. The digital microfluidics system (1) of claim 9, wherein the cartridge accommodation sites (8) are configured for top-entry loading the disposable cartridge (2).

18. The digital microfluidics system (1) of claim 9, wherein the electrode arrays (9) are covered by a dielectric layer (24).

19. The digital microfluidics system (1) of claim 9, wherein the spacer (5) of the cartridge (2) comprises an enlarged spacer portion that is configured to be reached by an automated pipettor, a handheld pipette or a pipetting robot.

20. The digital microfluidics system (1) of claim 9, wherein said enlarged spacer portion is equipped with a pierceable, self-sealing membrane (31) that enables a piercing pipette tip (20) to be pushed through.

21. The digital microfluidics system (1) of claim 9, wherein the gap (6) of the disposable cartridge (2) is substantially filled with silicon oil.

22. The digital microfluidics system (1) of claim 9, wherein the bottom layer (3) the disposable cartridge (2) is covered by a dielectric layer (24) or the bottom layer (3) itself is made from a dielectric material.

23. A digital microfluidics system (1) for manipulating samples in liquid droplets, within disposable cartridges (2) that comprise a bottom layer (3), a top layer (4), and a gap (6) between the bottom and top layers (3,4); the digital microfluidics system (1) comprising:

(a) a base unit (7) with at least one cartridge accommodation site (8) that is configured for taking up a disposable cartridge (2);

(b) at least one electrode array (9) substantially extending in a first plane and comprising a number of individual electrodes (10), said at least one electrode array (9) being located at said cartridge accommodation site(s) (8) of the base unit (7), and said electrode array (9) being supported by a bottom substrate (11);

(c) at least one cover plate (12) with a top substrate (13), the at least one cover plate (12) being located at said cartridge accommodation site(s) (8) and being equipped with an electrically conductive material (15) that extends in a second plane and substantially parallel to the electrode array (9) of the cartridge accommodation site (8) the at least one cover plate (12) is assigned to, the cover plate (12) being configured to be movable about a hinge (16) and/or in a direction that is substantially normal with respect to the electrode array (9) of the respective cartridge accommodating site (8), and being configured to apply a force to a disposable cartridge (2) that is accommodated at the cartridge accommodation site (8) of the base unit (7), which force urges the disposable cartridge (2) against the electrode array (9);

(d) the disposable cartridge (2) for manipulating samples in liquid droplets, the disposable cartridge (2) comprising:

a bottom layer (3), a top layer (4), and a gap (6) between the bottom and top layers (3,4), wherein the bottom layer (3) and the top layer (4) comprise a hydrophobic surface (17) that is exposed to the gap (6) of the cartridge (2), and at least one spacer (5) that defines the gap (6) between the bottom and top layers (3,4); and (e) a central control unit (14) for controlling the selection of the individual electrodes (10) of said at least one electrode array (9) and for providing these electrodes (10) with individual voltage pulses for manipulating liquid droplets within said cartridges (2) by electrowetting.

24. The digital microfluidics system (1) of claim 23, wherein the cartridge accommodation sites (8) are configured for receiving the disposable cartridge (2) inserted slidingly that is movable in a direction substantially parallel with respect to the electrode array (9) of the respective cartridge accommodating site (8).

25. The digital microfluidics system (1) of claim 24, wherein said electrically conductive material (15) of the cover plate (12) is not connected with a source of a certain electrical potential or grounded.

26. The digital microfluidics system (1) of claim 23, wherein the electrically conductive material (15) of the cover plate (12) is configured as a metal plate or foil that is attached to the top substrate (13).

27. The digital microfluidics system (1) of claim 23, wherein the electrically conductive material (15) of the cover plate (12) is configured as a metal layer that is deposited onto the top substrate (13).

28. The digital microfluidics system (1) of claim 23, wherein the electrically conductive material (15) of the cover plate (12) is configured as a plastic material with electrically conductive filler that is attached or integrated into the top substrate (13).

29. The digital microfluidics system (1) of claim 23, wherein the cover plate (12) is made of metallic conductive material and comprises both the top substrate (13) and the electrically conductive material (15) as a single integrated part.

30. The digital microfluidics system (1) of one of the claims 23 to 29, wherein the electrically conductive material (15) of the cover plate (12) is covered by a plastic layer.

31. The digital microfluidics system (1) of claim 23, wherein the electrically conductive material (15) of the cover plate (12) is configured as a metal plate, a metal foil, or a metal layer that is sandwiched between materials of the top substrate (13).

32. The digital microfluidics system (1) of claim 23, wherein the disposable cartridge (2) does not have a conductive layer.

33. A digital microfluidics system (1) for manipulating samples in liquid droplets, within disposable cartridges (2) that comprise a bottom layer (3), a top layer (4), and a gap (6) between the bottom and top layers (3,4); the digital microfluidics system (1) comprising:

(a) a base unit (7) with at least one cartridge accommodation site (8) that is configured for taking up a disposable cartridge (2);

(b) at least one electrode array (9) substantially extending in a first plane and comprising a number of individual electrodes (10), said at least one electrode array (9) being located at said cartridge accommodation site(s) (8) of the base unit (7), and said electrode array (9) being supported by a bottom substrate (11);

(c) at least one cover plate (12) with a top substrate (13), the at least one cover plate (12) being located at said cartridge accommodation site(s) (8), the cover plate (12) being configured to be movable about a hinge (16) and/or in a direction that is substantially normal with respect to the electrode array (9) of the respective cartridge accommodating site (8), and being configured to apply a force to a disposable cartridge (2) that is accommodated at the cartridge accommodation site (8) of the base unit (7), which force urges the disposable cartridge (2) against the electrode array (9);

(d) the disposable cartridge (2) for manipulating samples in liquid droplets, the disposable cartridge (2) comprising:

a bottom layer (3), a top layer (4), and a gap (6) between the bottom and top layers (3,4), wherein the bottom layer (3) and the top layer (4) comprise a hydrophobic surface (17) that is exposed to the gap (6) of the cartridge (2), at least one spacer (5) that defines the gap (6) between the bottom and top layers (3,4);

and an electrically conductive material (15) that is attached to an outer surface of the top layer (4) and that extends in a second plane and substantially parallel to the electrode array (9) of the cartridge accommodation site (8) the at least one cover plate (12) is assigned to;

(e) a central control unit (14) for controlling the selection of the individual electrodes (10) of said at least one electrode array (9) and for providing these electrodes (10) with individual voltage pulses for manipulating liquid droplets within said cartridges (2) by electrowetting.

34. The digital microfluidics system (1) of claim 33, wherein said electrically conductive material (15) of the disposable cartridge (2) is not connected to a source of a distinct electrical potential.

35. The digital microfluidics system (1) of claim 33, wherein said electrically conductive material (15) of the cartridge (2) is configured as an electrically conductive film or thin film coating on the outer surface of the top layer (4) of the disposable cartridge (2).

36. The digital microfluidics system (1) of claim 33, wherein the cartridge accommodation sites (8) are configured for front-entry loading the disposable cartridge (2).

37. The digital microfluidics system (1) of claim 33, wherein the cartridge accommodation sites (8) are configured for top-entry loading the disposable cartridge (2).

38. The digital microfluidics system (1) of claim 33, wherein the electrode arrays (9) are covered by a dielectric layer (24).

39. The digital microfluidics system (1) of claim 33, wherein the spacer (5) of the cartridge (2) comprises an enlarged spacer portion that is configured to be reached by an automated pipettor, a handheld pipette or a pipetting robot.

40. The digital microfluidics system (1) of claim 39, wherein said enlarged spacer portion is equipped with a pierceable, self-sealing membrane (31) that enables a piercing pipette tip (20) to be pushed through.

41. The digital microfluidics system (1) of claim 33, wherein the gap (6) of the disposable cartridge (2) is substantially filled with silicon oil.

42. The digital microfluidics system (1) of claim 33, wherein the bottom layer (3) the disposable cartridge (2) is covered by a dielectric layer (24) or the bottom layer (3) itself is made from a dielectric material.

* * * * *